US011054015B2

(12) United States Patent
Antes et al.

(10) Patent No.: US 11,054,015 B2
(45) Date of Patent: Jul. 6, 2021

(54) GEARBOX FOR A PLANETARY GEAR

(71) Applicant: Bühler Motor GmbH, Nuremberg (DE)

(72) Inventors: Michael Antes, Kunreuth (DE); Bernd Reinecker, Nuremberg (DE); Olaf Richter, Stein (DE); Klaus Weiske, Schwaig (DE); Reiner Hettych, Nuremberg (DE)

(73) Assignee: BÜHLER MOTOR GMBH, Nuremberg (DE)

( * ) Notice: Subject to any disclaimer, the term of this patent is extended or adjusted under 35 U.S.C. 154(b) by 47 days.

(21) Appl. No.: 16/211,670

(22) Filed: Dec. 6, 2018

(65) Prior Publication Data
US 2019/0178363 A1 Jun. 13, 2019

(30) Foreign Application Priority Data
Dec. 7, 2017 (DE) .................. 10 2017 129 110.5

(51) Int. Cl.
| *F16H 57/021* | (2012.01) |
| *F16H 1/46* | (2006.01) |
| *B23K 26/046* | (2014.01) |
| *B23K 26/08* | (2014.01) |
| *B23K 26/28* | (2014.01) |
| *B23K 37/047* | (2006.01) |

(Continued)

(52) U.S. Cl.
CPC ......... *F16H 57/021* (2013.01); *B23K 26/046* (2013.01); *B23K 26/0823* (2013.01); *B23K 26/28* (2013.01); *B23K 37/047* (2013.01); *F16H 1/28* (2013.01); *F16H 1/46* (2013.01); *F16H 57/08* (2013.01); *H02K 7/116* (2013.01); *B23K 2101/008* (2018.08); *F16H 2057/02034* (2013.01); *F16H 2057/02086* (2013.01)

(58) Field of Classification Search
CPC . F16H 2057/02034; F16H 2057/02086; F16H 57/021; F16H 57/08; F16H 1/28; F16H 1/46; H02K 7/116; B23K 26/046; B23K 26/0823; B23K 26/28; B23K 37/047; B23K 2101/008
See application file for complete search history.

(56) References Cited

U.S. PATENT DOCUMENTS

| 2009/0057452 A1* | 3/2009 | Tang ........................ F16H 1/46 241/169.1 |
| 2010/0261572 A1* | 10/2010 | Riester .................... F16H 57/08 475/331 |

(Continued)

FOREIGN PATENT DOCUMENTS

| EP | 2479458 B1 * | 7/2012 | ........... F16H 57/033 |

*Primary Examiner* — Charles A Fox
*Assistant Examiner* — Lori Wu
(74) *Attorney, Agent, or Firm* — Westerman, Hattori, Daniels & Adrian, LLP

(57) ABSTRACT

A gearbox for a planetary gear having a hollow-cylindrical housing body having a first internal gear, and a bearing flange engaging at least in sections coaxially in the housing body, so that an overlap area is formed, wherein the housing body and the bearing flange are firmly bonded to each other in the overlap area by laser irradiation welding. The bearing flange has a second internal gear in the overlap area. The gearbox relates to a planetary gear and a motor/transmission combination having such a gearbox and a production method thereof.

14 Claims, 2 Drawing Sheets

(51) Int. Cl.
  *F16H 1/28* (2006.01)
  *F16H 57/08* (2006.01)
  *H02K 7/116* (2006.01)
  *F16H 57/02* (2012.01)
  *B23K 101/00* (2006.01)

(56) References Cited

U.S. PATENT DOCUMENTS

| | | |
|---|---|---|
| 2013/0255438 A1 | 10/2013 | Kieninger |
| 2013/0274049 A1* | 10/2013 | Zhu .......................... F16H 1/46 |
| | | 475/149 |

* cited by examiner

GEARBOX FOR A PLANETARY GEAR

CROSS-REFERENCE TO RELATED APPLICATIONS

The present patent application is based on, and claims priority from, German Application No. DE 10 2017 129 110.5, filed Dec. 7, 2017, which is incorporated herein by reference in its entirety.

BACKGROUND OF THE INVENTION

(1) Field of the Invention

The invention relates to a gearbox for a planetary gear. The invention further relates to a planetary gear and a motor/transmission combination having such a gearbox. The invention also relates to a method for producing a gearbox.

(2) Description of Related Art Including Information Disclosed Under 37 CFR 1.97 and 1.98

US 2013 255438 A1 describes a gearbox which has a substantially hollow-cylindrical housing body. An internal gear is integrated into the housing body. The housing body is open on both sides and is closed axially longitudinally with a bearing flange. In this way, it is provided to firmly bond the respective bearing flange to the housing body by laser irradiation welding. For this purpose, an overlap area is provided in which the bearing flange and the housing body overlap in sections. A laser beam is directed onto this overlap area, so that the material of the bearing flange melts and firmly bonds to the housing body. This production method can be implemented particularly simply and cost-effectively.

Particularly in small transmissions, it is often necessary to realize a very high transmission ratio with gearbox dimensions as compact as possible. In this case, the known gearbox has disadvantages since, because of the required overlap area, empty spaces are produced which remain unused.

In this respect, it is an object of the present invention to provide an improvement of the known gearbox, wherein in particular high functionality is to be realized with small dimensions of the gearbox. A further object of the invention is to propose a planetary gear and a motor/transmission combination with such a gearbox. Furthermore, it is an object of the invention to specify a corresponding production method

BRIEF SUMMARY OF THE INVENTION

Thus, the present invention is based on the idea of specifying a gearbox for a planetary gear with a hollow-cylindrical housing body, wherein the housing body has a first internal gear. The gearbox further comprises a bearing flange which engages coaxially in the housing body at least in sections so that an overlap area is formed. The housing body and the bearing flange are firmly bonded to each other in the overlap area by laser irradiation welding. According to the invention, it is now provided that the bearing flange has a second internal gear in the overlap area.

In the invention, the overlap area is therefore additionally used to provide a second internal gear. This has the advantage that an additional planetary gear can be integrated with compact dimensions of the gearbox. A plurality of different gear reductions with different reduction gear ratios can thus be realized. In this way, the gearbox according to the invention has high functionality overall with compact dimensions.

A further advantage of the invention results from the production of the gearbox according to the invention. In the case of known housing bodies, which have two internal gears, it is absolutely necessary for these housing bodies to be axially open on both sides. Only in this way is it possible for the two internal gears to be formed independently of one another in the housing body. In contrast, in the invention, it is sufficient if the housing body is axially open on one side, since the second internal gear is arranged in the bearing flange, which is subsequently connected to the housing body. The bearing flange can also be axially open only on one side in order to be able to form the second internal gear. In total, the gearbox can thus be manufactured from a small number of parts, which on the one hand facilitates installation and on the other hand increases the stability of the gearbox.

In this respect, it is provided in a preferred embodiment of the invention that the housing body and the bearing flange each have a bearing plate, which axially limits an interior space of the gearbox. The bearing plate can have a bearing receptacle for a shaft bearing. It is in particular preferably provided that a bearing receptacle for a shaft bearing is concentrically formed in the bearing plate. The bearing plate thus axially covers the gearbox, in particular the housing body or the bearing flange. In this respect, despite the bearing receptacle arranged therein, the bearing plate forms an axial boundary so that the housing body or the bearing flange are axially closed on one side.

It is preferably provided that the housing body and/or the bearing flange are respectively formed integrally, in particular with their respective associated bearing plate. This reduces the number of parts of the gearbox according to the invention and furthermore increases the stability of the housing body and the bearing flange. Because of the small number of parts, installation is moreover simplified. Overall, the design of the gearbox and/or the bearing flange in an integral type of construction leads to a reduction in production costs, in particular installation costs.

In a preferred embodiment of the invention, it can be provided that the housing body and the bearing flange are pressure bonded at least in sections in the overlap area. The pressure bond allows the housing body and the bearing flange to be sufficiently prefixed in the overlap area so that a well-sealed weld connection by means of laser irradiation welding can be produced.

It is preferably provided that the first internal gear abuts against the second internal gear. In other words, it may be provided that the second internal gear of the bearing flange extends to a longitudinal axial edge region of the bearing flange. The bearing flange can then engage in the housing body to such an extent that the longitudinal axial edge of the bearing flange abuts directly against the first internal gear. The second internal gear thus abuts directly against the first internal gear. Such a design uses the available interior space of the gearbox well so that compact outer dimensions can be realized overall.

However, for reasons of manufacturing tolerance, it may also be provided to present an air gap between the first internal gear and the second internal gear. This air gap can, for example, also be appropriate to compensate for a thermal expansion of the gearbox. In this regard, the invention not only comprises embodiments in which the first internal gear and the second internal gear directly abut each other but also includes embodiments in which the first internal gear and the second internal gear are arranged at a distance from each other.

In a further preferred embodiment of the gearbox according to the invention, it is provided that the bearing flange has a radially outwardly extending annular web. The circumferential outer surface of the annular web may be flush with a circumferential outer surface of the housing body. A uniform external geometry of the gearbox is thus created, which is advantageous for different installation situations. However, the external geometry of the bearing flange and/or of the housing body, in particular of the entire gearbox, can also be designed differently. For example, a polygonal external geometry may be provided. It is also possible for the annular web to extend beyond the circumferential outer surface of the housing body, for example, in order to form a stop for the installation of the gearbox.

The annular web can additionally have at least one axially parial recess in which an axially parallel projection of the housing body engages in a form-fit manner. In this respect, the projection of the housing body forms a torsion lock with the recess in the annular web. In this way, a rotational position between the bearing flange and the housing body is thus predetermined. It can thus be ensured that the housing body and the bearing flange are correctly aligned with one another before a firmly bonded connection is established between the housing body and the bearing flange by means of laser irradiation welding.

Alternative embodiments optionally dispense with the axially parallel projection on the housing body so that a relative rotation between the bearing flange and the housing body is possible.

The axially parallel projection and the axially parallel recess can be formed to be complementary to one another. In particular, the axially parallel projection and the axially parallel recess can be formed to be complementarily trapezoidal. When connecting the bearing flange to the housing body, the bearing flange is preferably inserted in an axially longitudinal manner into the housing body. The axially parallel projection is thus inserted parallel to the longitudinal axis of the gearbox into the axially parallel recess. A trapezoidal design of the projection and of the recess thus forms a positioning aid, so that the bearing flange aligns essentially automatically correctly with respect to the housing body. In this respect, a trapezoidal design of the projection and the recess has a self-centering effect.

However, the invention is not limited to a trapezoidal configuration of the projection and recess. Alternative geometries for the axially parallel projection and the axially parallel recess are likewise possible, provided that the geometries of the projection and of the recess are complementary to one another in each case. In particular, it can be provided that the projection and the recess are formed to be complementarily triangular or at least semicircular or semi-oval.

In further preferred embodiments of the gearbox, it can be provided that the first internal gear and the second internal gear have gear geometries different from each other. In this case, the first internal gear can form a spur ring gear and the second internal gear can form a helical ring gear. Alternatively, the first internal gear may form a helical ring gear and the second internal gear may form a spur ring gear. It is also possible for both internal gears to have the same ring gear geometry.

The invention further relates to a planetary gear with a gearbox described above and at least one first planetary gear meshing with a first sun gear and with the first internal gear. Furthermore, at least one second planetary gear is provided, which meshes with a second sun gear and with the second internal gear. Essentially, the invention thus comprises a planetary gear with two gear stages which are integrated together in the gearbox described above.

A further aspect of the invention relates to a motor/transmission combination with a previously explained planetary gear and a motor housing, wherein the motor housing coaxially surrounds a motor-side connecting section of the bearing flange and is connected to the motor-side connecting section. The connection between the motor housing and the motor-side connecting section of the bearing flange preferably takes place in a torsion-proof manner.

It may be provided in particular that the connecting section has at least one crimp receptacle for a radially inwardly deformable crimp nose of the motor housing. In this respect, a particularly simple connection between the gearbox and the motor housing is achieved. A stable connection is thus established by radial crimping. In this case, the crimping connection can be implemented simply and cost-effectively.

Furthermore, the invention relates to a method for producing a previously described gearbox. In the production method according to the invention, a housing body with a first internal gear and a bearing flange with a second internal gear are provided. The housing body and the bearing flange are coaxially joined together in a form-fit manner so that an overlap area is formed. A laser beam is subsequently directed onto the overlap area so that the housing body and the bearing flange are firmly bonded to each other by means of laser irradiation welding.

In a preferred variation of the production method according to the invention, the gearbox is rotated during the laser irradiation welding so that a circumferential weld seam is formed. Alternatively, it is possible that the gearbox is held stationary and, instead, a laser beam rotates around the gearbox so that a circumferential weld seam is formed. It is advantageous in any case, when a circumferential weld seam is formed, since in this way, a high stability of the weld bond on the one hand and a good seal of the gearbox on the other hand can be achieved.

For efficient firmly bonded connection of the bearing flange to the housing body, it is preferably provided that the laser beam focuses onto a circumferential outer surface of the bearing flange. The laser beam essentially trans-illuminates the material of the housing body in the overlap area and concentrates thermal energy on the circumferential outer surface of the bearing flange. As a result, temperatures which lead to melting of the materials are produced in the region between the bearing flange and the housing body. In this way, the materials are firmly bonded so that a solid, dense and stable connection between the bearing flange and housing body is produced.

BRIEF DESCRIPTION OF THE SEVERAL VIEWS OF THE DRAWINGS

In the following, the invention is explained in more detail on the basis of a preferred exemplary embodiment and by reference to the enclosed, schematic drawings. Therein are shown.

DETAILED DESCRIPTION OF THE INVENTION

Figure 1:
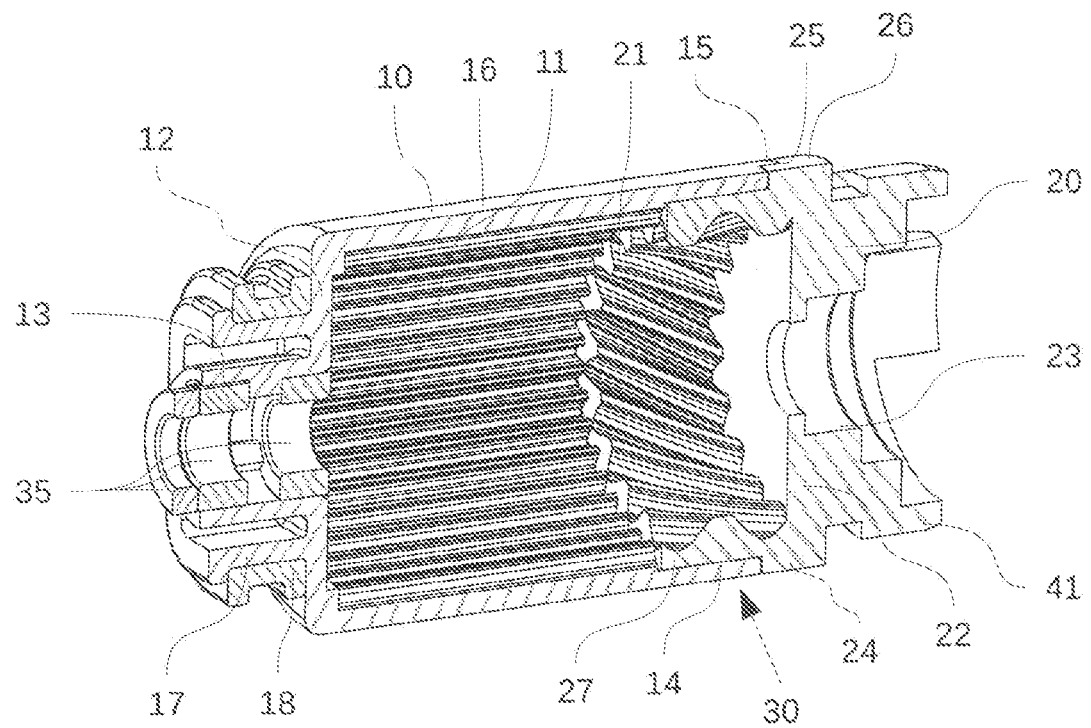
FIG. 1 is a perspective sectional view of a gearbox according to the invention according to a preferred exemplary embodiment.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

In the accompanying drawings, a gearbox is respectively shown, which has a hollow-cylindrical housing body 10 and a bearing flange 20. The hollow-cylindrical housing body 10 comprises a first internal gear 11. The bearing flange 20 is also hollow-cylindrical at least in sections and has a second internal gear 21.

Figure 2:
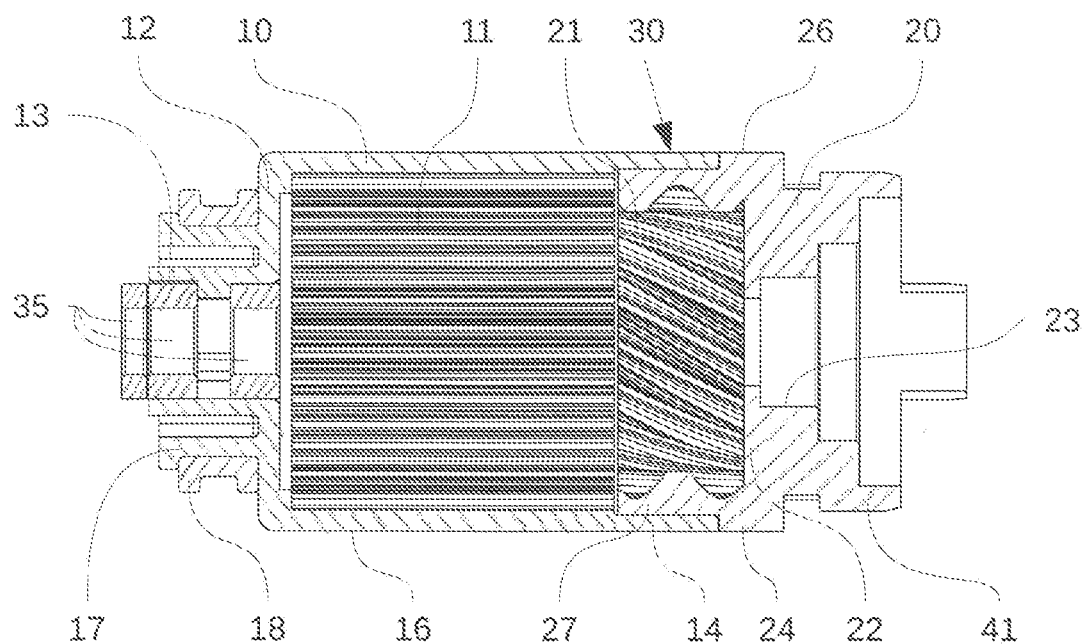
FIG. 2 is a longitudinal sectional view of the gearbox according to FIG. 1.

As can be seen well in FIG. 2, for example, the bearing flange 20 is inserted coaxially into the housing body 10. In this case, a hollow-cylindrical section, in which the second internal gear 21 is arranged, engages in an annular flange 14 of the housing body 10. The annular flange 14 is essentially a longitudinal axial end section of the housing body 10 which is designed without teeth. The annular flange 14 surrounds a longitudinal axial end section 27 of the bearing flange 20. In this case, the annular flange 14 completely covers the end section 27 on its circumferential outer surface. Specifically, it is preferably provided that a pressure bond is produced between the end section 27 and the annular flange 14.

The region in which the annular flange 14 overlaps the end section 27 is referred to in the context of the present invention as the overlap area 30. At least in the overlap area 30, the housing body 10 or the annular flange 14 preferably comprises a material which is transparent to laser light. The bearing flange 20 preferably has a laser light-absorbing material in the overlap area 30, in particular in its end section 27.

The housing body 10 and the bearing flange 20 are connected to each other by laser irradiation welding. In doing so, a laser beam is directed onto the overlap area 30 from outside. The laser light penetrates the laser light-transparent material of the annular flange 14 and impinges on the end section 27 of the bearing flange 20. The material of the end section 27 absorbs the laser light so that a local temperature increase occurs. Material at the contact surfaces between the end section 27 and the annular flange 14 is melted thereby and the end section 27 is thus fused locally with the annular flange 14. In this way, the end section 27 and the annular flange 14 are firmly bonded to each other.

Figure 3:
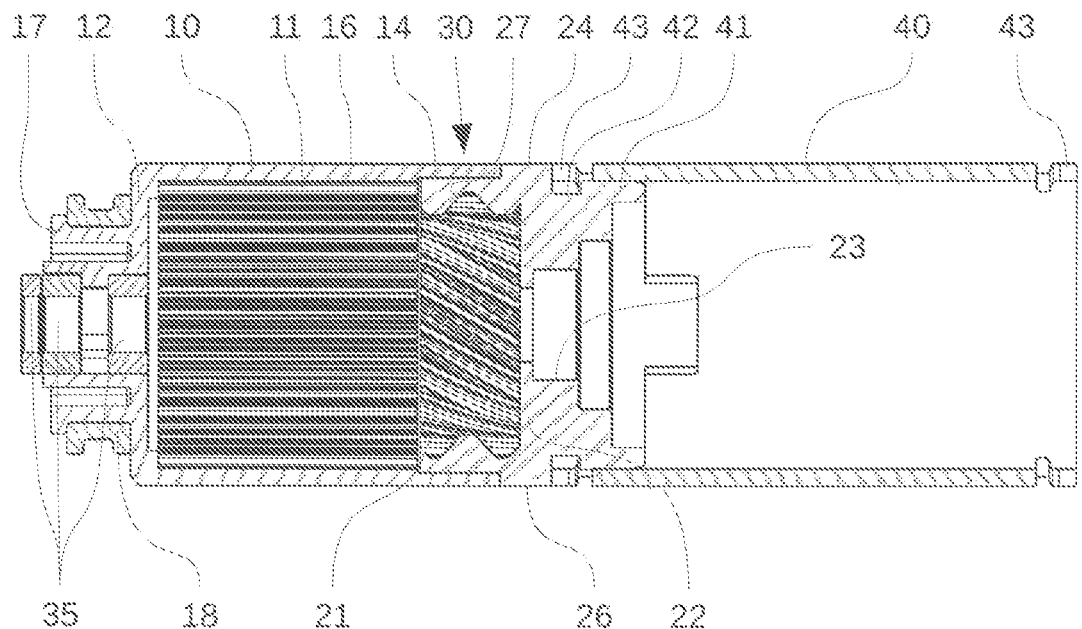
FIG. 3 is a longitudinal sectional view of a motor/transmission combination according to the invention according to a preferred exemplary embodiment.

In the exemplary embodiments according to FIGS. 1 to 3, it is respectively provided that the housing body 10 has a bearing plate 12. The bearing plate 12 of the housing body 10 is arranged in the bearing flange 20 at an opposite end of the housing 10. In particular, the bearing plate 12 of the housing body 10 and the housing body 10 are integrally formed. For example, the housing body 10 can be produced with the bearing plate 12 as a one-piece plastic injection-molded part.

A bearing receptacle 13 is arranged in the bearing plate 12 of the housing body 10. The bearing receptacle 13 is formed by a hollow-cylindrical section which is aligned coaxially with respect to the longitudinal axis of the housing body 10. In the bearing receptacle 13 of the housing body 10, shaft bearings 35 are arranged in the exemplary embodiment according to FIGS. 1 and 2. The shaft bearings make it possible to mount a shaft for a planetary gear. An output shaft 49 (FIG. 4) of a planetary gear can preferably be arranged or is preferably arranged in the bearing receptacle 13 of the housing body 10 by means of shaft bearings 35.

The bearing flange 20 also has a bearing plate 22. The bearing plate 22 of the bearing flange 20 covers the bearing flange 20 axially longitudinally. Furthermore, a bearing receptacle 23 is arranged in the bearing plate 22 of the bearing flange 20. The bearing receptacle 23 serves to receive a shaft bearing for a motor shaft of an electric motor. It is preferably provided that an electric motor is connected to the gearbox via the bearing flange 20. Such a connection is shown, for example, in FIG. 3.

The bearing flange 20 also has at least one annular web 24 which serves as an end stop for the annular flange 14. As can be clearly seen in FIG. 2, the bearing flange 20 is inserted coaxially into the housing body 10 so far that the annular flange 14 abuts against the annular web 24. In this case, the annular web 24 has a height which is selected such that a circumferential outer surface 26 of the bearing flange 20, in particular of the annular web 24, is flush with the circumferential outer surface 16 of the housing body 10, in particular of the annular flange 14. Other dimensions are, of course, possible. For example, the annular web 24 can project beyond the circumferential outer surface 16 of the housing body 10 in order to form, for example, a holder or a stop for connection to external assemblies.

It is readily apparent in FIG. 2 that the first internal gear 11, preferably formed as a spur ring gear, extends from the bearing plate 12 of the housing body 10 to the end section 27 of the bearing flange 20. In this respect, essentially the entire free interior space of the housing body 10 is filled by the first internal gear 11. The space available in the gearbox is thus optimally utilized.

The bearing flange 20 has a second internal gear 21 which is formed as a helical ring gear in the exemplary embodiments shown. The second internal gear 21 extends from the bearing plate 22 of the bearing flange 20 to the end of the end section 27. In particular, it is provided that the second internal gear 21 extends essentially as far as the first internal gear 11. However, it is possible and also provided in the exemplary embodiment according to FIGS. 1 and 2 that an air gap remains between the first internal gear 11 and the second internal gear 21. In this respect, it can be provided that the end section 27 of the bearing flange 20 is shorter than the annular flange 14 of the housing body 10. Thus, an air gap remains between the first internal gear 11 and the second internal gear 21 when the annular flange 14 of the housing body 10 abuts against the annular web 24 of the bearing flange 20. This design with an air gap between the internal gears 11, 21 can, for example, compensate for fault tolerances which result from the production method, in particular the plastic injection molding, for the housing body 10 and/or for the bearing flange 20.

FIG. 1 also indicates that the annular flange 14 has an axially parallel projection 15. The projection extends beyond the axial end of the annular flange 14 and engages in a complementary, axially parallel recess 25 in the annular web 24. In this case, the projection 15 and the recess 25 can be designed in such a way that a simple insertion of the projection 15 into the recess 25 is possible. For example, the projection 15 and the recess 25 can be trapezoidal or triangular so that self-centering results. Other self-centering and/or torsion-proof geometries of the projection 15 and the recess 25 are also possible.

The axially parallel projection 15 which engages in the axially parallel recess 25 also provides a torsion-proof connection between the bearing flange 20 and the housing body 10. In this way, positioning of bearing flange 20 and housing body 10 relative to one another is also easily possible.

Generally, multiple projections 15 and recesses 25 may be provided, which are respectively formed complementary to each other. In this case, the plurality of projections 15 and recesses 25 can have identical or different complementary geometries. If the plurality of projections 15 and recesses 25 have different complementary geometries, an incorrect assembly (Poka Yoke principle) is advantageously also avoided, since the bearing flange 20 is connectable to the housing body 10 only in a predetermined rotational orientation.

For inclusion of the gearbox according to FIGS. 1 and 2 into a complex assembly, for example in a vehicle and/or in a medical device, the housing body 10 additionally has at its bearing flange 12 a mounting flange 17. The mounting flange 17 is shown in FIGS. 1 and 2 as a substantially rectangular, circumferential flange, whose corners are rounded. A sealing element 18 extends around the mounting flange 17.

FIG. 3 shows the connection of the gearbox to a motor housing 40. The gearbox comprises a housing body 10 with a bearing plate 12. A mounting flange 17 and a bearing receptacle 13 are provided on the bearing plate 12. The bearing plate 12, the housing body 10, the bearing receptacle 13 and the mounting flange 17 are preferably formed integrally, in particular as a plastic injection-molded part.

The gearbox according to FIG. 3 further comprises a bearing flange 20 which comprises a bearing plate 22 with a bearing receptacle 23. The bearing plate 22 also has an annular web 24, whose circumferential outer surface 26 is aligned flush with the circumferential outer surface 16 of the housing body 10. The bearing flange 20 is preferably formed integrally with the bearing plate 22 and the annular web 24, in particular as a plastic injection-molded part.

The bearing flange 20 engages with its end section 27 in the housing body 10, in particular the annular flange 14, wherein the annular flange 14 is in particular pressure bonded to the end section 27. Furthermore, the annular flange 14 and the end section 17 are firmly bonded to each other by laser irradiation welding.

A motor-side connecting section 41 is formed on a side of the annular web 24 that is axially opposite to the end section 17. The motor-side connecting section 41 is lowered radially inwardly to such an extent that a motor housing 40 can be attached to the annular web 24 such that the circumferential outer surface of the motor housing 40 is flush with the circumferential outer surface of the bearing flange 26, in particular of the annular web 24. Thus, the outer dimensions of the motor/transmission combination are kept small.

FIG. 3 also clearly shows that a crimp receptacle 42 is formed to be adjacent to the annular web 24 in the bearing flange 20. The crimp receptacle 42 is formed by a plurality of grooves arranged and distributed on the circumference of the bearing flange 20 in a circumferential line. It is also possible, that a single circumferential groove forming a crimp receptacle 42 is provided in the bearing flange 20.

The motor housing 40 includes crimp noses 43 on at least one longitudinal axial end. The crimp noses 43 are substantially circumferentially aligned projections, which are arranged in the region of the crimp receptacles 42 when the motor housing 40 is placed on the motor-side connecting section 41 of the bearing flange 20. Through a cold deformation, so-called crimping, the crimp noses 43 can now be bent radially inwardly and engage in the crimp receptacles 42. This forms an axial securing of the motor housing 40 on the gearbox. If, as provided in the embodiment according to FIG. 3, a plurality of crimp receptacles 42 are arranged circumferentially distributed over the bearing flange 20, a torsion lock moreover results by means of the crimping connection between the motor housing 40 and the gearbox.

The production of the gearbox according to a preferred embodiment is described below: (1) The gearbox is preferably formed completely from plastic, wherein the housing body 10 and the bearing flange 20 are first produced by plastic injection molding. (2) In doing so, a laser light-transparent plastic material is preferably chosen for the housing body 10. (3) The housing body 10 is integrally molded with the bearing plate 12. (4) The bearing flange 20 is also integrally formed with its bearing plate 22 by a plastic injection molding process. (5) For the bearing flange 20, however, a plastic material which absorbs laser light is chosen. (6) The bearing flange 20 is inserted with its end section 27 into the annular flange 14 of the housing body 10. In this case, a slight pressure bond is preferably produced so that the bearing flange 20 is prefixed with the housing body 10. (7) In a next working step, a laser beam is directed onto the circumferential outer surface of the housing body 10 in the overlap area 30. The laser beam penetrates the annular flange 14 and impinges on the circumferential outer surface of the end section 27 of the bearing flange 20. At this location, there is a local temperature increase so that the material of the housing body 10 and the bearing flange 20 melts locally in the region of the contact surfaces of the overlap area 30. The plastic material flows into one another and thus forms a firmly bonded connection.

In order to produce the firmly bonded connection over the entire circumference of the gearbox, it is preferably provided that the laser beam and the gearbox are rotated relatively to one another. In doing so, either the gearbox can be rotated so that the laser beam sweeps over the entire outer circumference of the gearbox. Alternatively, the gearbox can be held stationary and the laser beam is pivoted around the gearbox.

Preferably, the laser beam is set to focus onto the circumferential outer surface 26 of the end section 27 of the bearing flange 20. Energy-efficient laser irradiation welding is thus accomplished.

Figure 4:
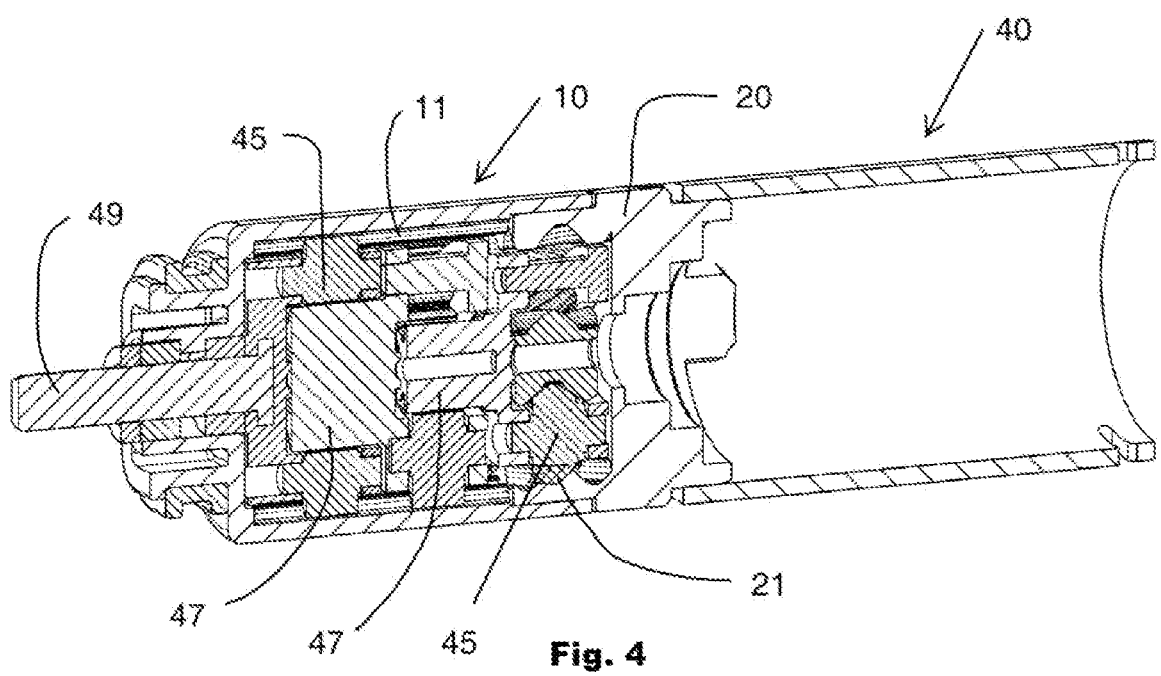
FIG. 4 is perspective view showing the incorporation of planetary gears.

With reference to FIG. 4, in order to produce a complete planetary gear with the gearbox, it is preferably provided that planet gears 45 and sun gears 47 of the planetary gear are arranged in the housing body 10 or in the bearing flange 20 before the pressure bond between the housing body 10 and the bearing flange 20 is produced. The bearing flange 20 is subsequently connected to the housing body 10 and firmly bonded.

The invention described above is particularly suitable for producing miniature transmissions. The planetary gear can have between 1 and 5, in particular between 1 and 4, gear stages. In this case, transmission ratios of up to 2000:1, in particular up to 1800:1, preferably up to 1708:1 or up to 1650:1, are possible. Planetary gears according to the invention can be used in particular in medical technology, for example for medication pumps, or in the automotive field. Furthermore, the planetary gears can also be used in the field of industrial solutions, especially in the field of building automation. In this case, the planetary gears are used, for example, in shading systems, in particular for drives of awnings, blinds, roller shutters, Venetian blinds, for darkening and/or for sun protection. Furthermore, the planetary gears can also be used in door systems, gate systems and/or window systems, for example for automatic room ventilation. Other possible applications and areas of use are also conceivable.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS

10 Housing body
11 First internal gear
12 Bearing plate of the housing body
13 Bearing receptacle of the housing body
14 Annular flange
15 Parallel projection
16 Circumferential outer surface of the housing body
17 Mounting flange
18 Sealing element
20 Bearing flange
21 Second internal gear
22 Bearing plate of the bearing flange
23 Bearing receptacle of the bearing flange
23 Annular web
25 Axially parallel recess
26 Circumferential outer surface of the bearing flange
27 End section
30 Overlap area
35 Shaft bearing
40 Motor housing
41 Motor-side connecting section
42 Crimp receptacle
43 Crimp nose
45 Planet gears
47 Sun gears
49 Output shaft

What is claimed is:

1. A gearbox for a planetary gear, the gearbox comprising:
a hollow-cylindrical housing body comprising a first internal gear, a circumferential outer surface of the housing body forming an outermost surface of the gearbox, and
a bearing flange comprising a second internal gear, the bearing flange coaxially engaging an end section of the housing body, so that an overlap area is formed;
wherein a laser irradiation weld bonds the housing body and the bearing flange to each other in the overlap area; and
wherein the second internal gear is disposed in the overlap area.

2. The gearbox according to claim 1,
wherein the housing body comprises a housing body bearing plate,
wherein the bearing flange comprises a bearing flange bearing plate, and
wherein the housing body bearing plate and the bearing flange bearing plate axially limit an interior space of the gearbox.

3. The gearbox according to claim 2, further comprising:
a shaft bearing;
at least one bearing receptacle for receiving the shaft bearing, the bearing receptacle being formed concentrically in at least one of the bearing plates.

4. The gearbox according claim 2,
wherein the housing body and the housing body bearing plate are formed integrally, and
wherein the bearing flange and the bearing flange bearing plate are formed integrally.

5. The gearbox according to claim 1, wherein the housing body and the bearing flange are pressure bonded in the overlap area.

6. The gearbox according to claim 1, wherein the first internal gear abuts against the second internal gear.

7. The gearbox according to claim 1, further comprising:
a radially outwardly extending annular web on the bearing flange,
wherein the annular web has a circumferential outer surface which is flush with the circumferential outer surface of the housing body.

8. The gearbox according to claim 7, further comprising:
an axially parallel projection in the housing body, and
wherein the annular web has at least one axially parallel recess which engages in a form-fit manner with the axially parallel projection in the housing body.

9. The gearbox according to claim 8, wherein the axially parallel projection and the axially parallel recess are formed to be complementarily trapezoidal.

10. The gearbox according to claim 1, wherein the first internal gear and the second internal gear have gear geometries different from each other.

11. The gearbox according to claim 1,
wherein the first internal gear is a spur ring gear and the second internal gear is a helical ring gear.

12. A planetary gear, comprising:
a gearbox according to claim 1,
at least one first planet gear meshing with a first sun gear and with the first internal gear, and
at least one second planet gear meshing with a second sun gear and with the second internal gear.

13. A motor/transmission combination, comprising:
a planetary gear according to claim 12, and
a motor housing,
wherein the motor housing coaxially surrounds a motor-side connecting section of the bearing flange, and
wherein the motor housing is connected to the connecting section, in a torsion-proof manner.

14. The motor/transmission combination according to claim 13, further comprising:
a radially inwardly deformable crimp nose of the motor housing,
wherein the connecting section has at least one crimp receptacle for mating with the radially inwardly deformable crimp nose.

* * * * *